(12) United States Patent
Holzmann et al.

(10) Patent No.: US 8,074,672 B2
(45) Date of Patent: Dec. 13, 2011

(54) INERTIALLY ACTIVATED EJECTION VALVE

(75) Inventors: Mark V. Holzmann, Stoughton, WI (US); Kaarthik Venkataraman, Stoughton, WI (US); Jim L. Alonzo, Verona, WI (US); Robert A. Bannister, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 413 days.

(21) Appl. No.: 12/402,857

(22) Filed: Mar. 12, 2009

(65) Prior Publication Data
US 2010/0229972 A1 Sep. 16, 2010

(51) Int. Cl.
*F16K 11/00* (2006.01)
(52) U.S. Cl. .............. 137/15.07; 137/242; 137/244
(58) Field of Classification Search ............ 137/532, 137/15.07, 242–244, 614.21
See application file for complete search history.

(56) References Cited

U.S. PATENT DOCUMENTS

| | | | |
|---|---|---|---|
| 3,816,982 A | 6/1974 | Regnault | |
| 4,162,906 A | 7/1979 | Sullivan et al. | |
| 4,204,849 A * | 5/1980 | Johnston | 55/310 |
| 4,388,091 A | 6/1983 | Khosropour | |
| 4,555,333 A * | 11/1985 | Laval, Jr. | 210/113 |
| 5,176,826 A | 1/1993 | Rosaen | |
| 5,212,948 A | 5/1993 | Gillingham et al. | |
| 5,882,367 A | 3/1999 | Morgan et al. | |
| 6,183,544 B1 | 2/2001 | Ormond et al. | |
| 7,222,837 B1 | 5/2007 | Blume | |
| 2007/0137150 A1 | 6/2007 | Goddard | |

OTHER PUBLICATIONS

Air Cleaner Extensions, Diesel Progress Show, http://shows.dieselpub.com/dpshow_2008, website visited Dec. 14, 2008.

* cited by examiner

*Primary Examiner* — Kevin Lee
(74) *Attorney, Agent, or Firm* — Andrus, Sceales, Starke & Sawall, LLP

(57) ABSTRACT

An ejector is provided for an induction system in a vibratory system generating vibration, including a dust ejector for an air induction system of an internal combustion engine. An ejection valve is provided by an inertial mass inertially activated and driven by the vibration to discharge contaminant from the induction system.

17 Claims, 5 Drawing Sheets

INERTIALLY ACTIVATED EJECTION VALVE

BACKGROUND AND SUMMARY

The invention relates to effluent or contaminant ejectors, including for air induction systems, including pre-cleaners and air filters, of internal combustion engines.

Effluent or contaminant ejectors, including dust ejectors for air induction systems of internal combustion engines, are known. The air induction system may include a pre-cleaner and an air filter. In one typical arrangement, a dust ejection valve is provided between the pre-cleaner and air filter, for ejecting collected dust.

The present invention arose during development efforts in the above technology, and provides an inertially activated effluent or contaminant ejector. The invention also arose during development efforts in providing a dust ejector for the air induction system of an internal combustion engine.

BRIEF DESCRIPTION OF THE DRAWINGS

FIG. 1 is a side elevation view of an air filter known in the prior art.

FIG. 2 is an end elevation view of the filter of FIG. 1.

DETAILED DESCRIPTION

Figure 1:
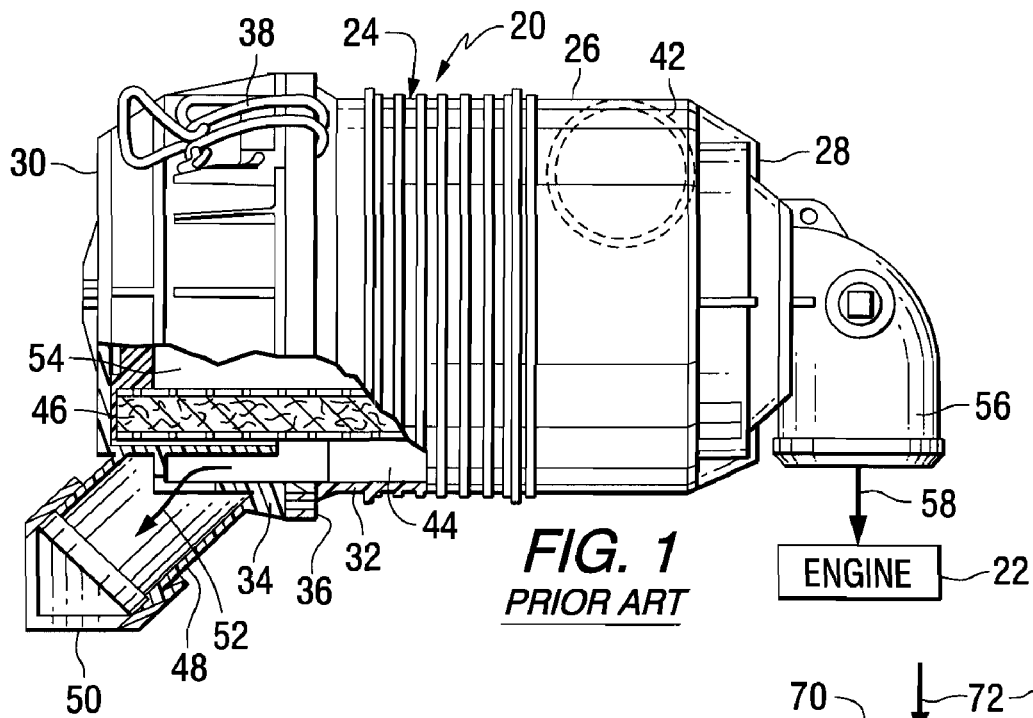
FIGS. 1 and 2 are taken from U.S. Pat. No. 5,882,367, incorporated herein by reference.
Figure 2:
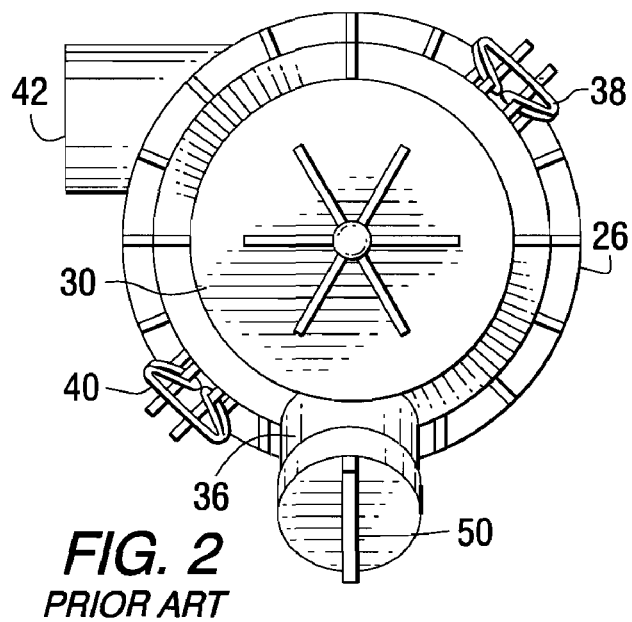

FIGS. 1 and 2 are taken from incorporated U.S. Pat. No. 5,882,367 and show an air induction system 20 for an internal combustion engine 22. The system includes an air filter assembly 24 including a generally cylindrical plastic housing 26 having distally opposite ends 28 and 30. The housing is provided by first and second sections 32 and 34 engaging each other at tongue and groove interface 36 and mounted to each other by clamps 38 and 40. The housing has an air inlet opening 42 admitting air into the housing (e.g. against a deflector plate as shown at 30 in FIG. 4 of the '367 patent) which air is directed into the annular space 44 around the periphery of cylindrical filter element 46 in the housing. The housing has a drain outlet 48 closed by dust ejector valve 50, as is known, for example a rubber duckbill valve. The spiral annular swirl in annular chamber 44 provides a pre-cleaner partially separating some of the dust from the inlet air stream, which dust is discharged as shown at arrow 52 through outlet 48 and dust ejection valve 50. The air in annular space 44 then flows radially inwardly through annular filter element 46 into hollow interior 54 and then axially rightwardly to outlet elbow tube 56 and then to engine 22 as shown at arrow 58. Dust ejection valve 50 may open in response to a given pressure differential thereacross, e.g. from the noted air stream, or may be manually opened, e.g. by squeezing the valve along a vertical direction in the orientation of FIG. 2.

Figure 3:
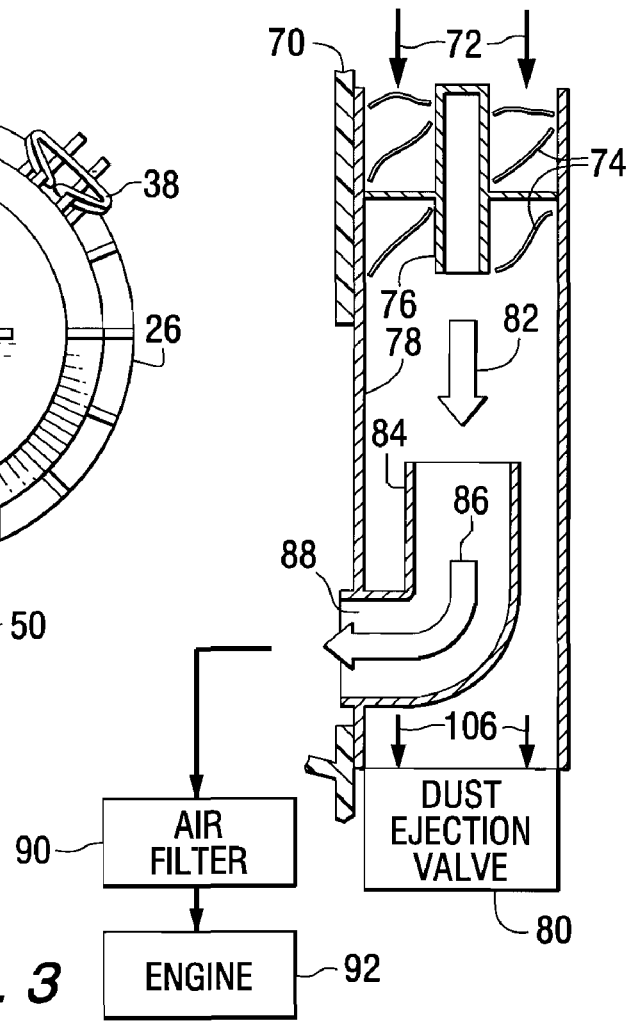
FIG. 3 is a schematic sectional view of an air induction system including a cyclonic pre-cleaner.

FIG. 3 shows an air induction system 70 receiving inlet air as shown at arrows 72 and directing the air through vanes such as 74 rotational about spindle 76, to provide cyclonic pre-cleaning to separate at least some of the dust from the air stream. The dust falls to the bottom of sleeve 78 for discharge by dust ejection valve 80, to be described. The air stream flows as shown at arrow 82 along the central section of sleeve 78 into elbow outlet tube 84 as shown at arrow 86 for side outlet discharge as shown at 88 and then flows to air filter 90 and internal combustion engine 92.

The present system provides an inertially activated effluent ejector, and in the preferred embodiment an inertially activated dust ejector for an air induction system of an internal combustion engine in a vibratory system generating vibration. The vibration may be that of the engine itself, or a driven component such as an eccentric rotary driven weight. The dust ejection valve may be provided at various places in the air induction system of the internal combustion engine, and is preferably provided between the pre-cleaner and the air filter, for example as shown at 50 in FIGS. 1, 2, and at 80 in FIG. 3, and in another alternative at outlet 88 in FIG. 3.

Figure 4:
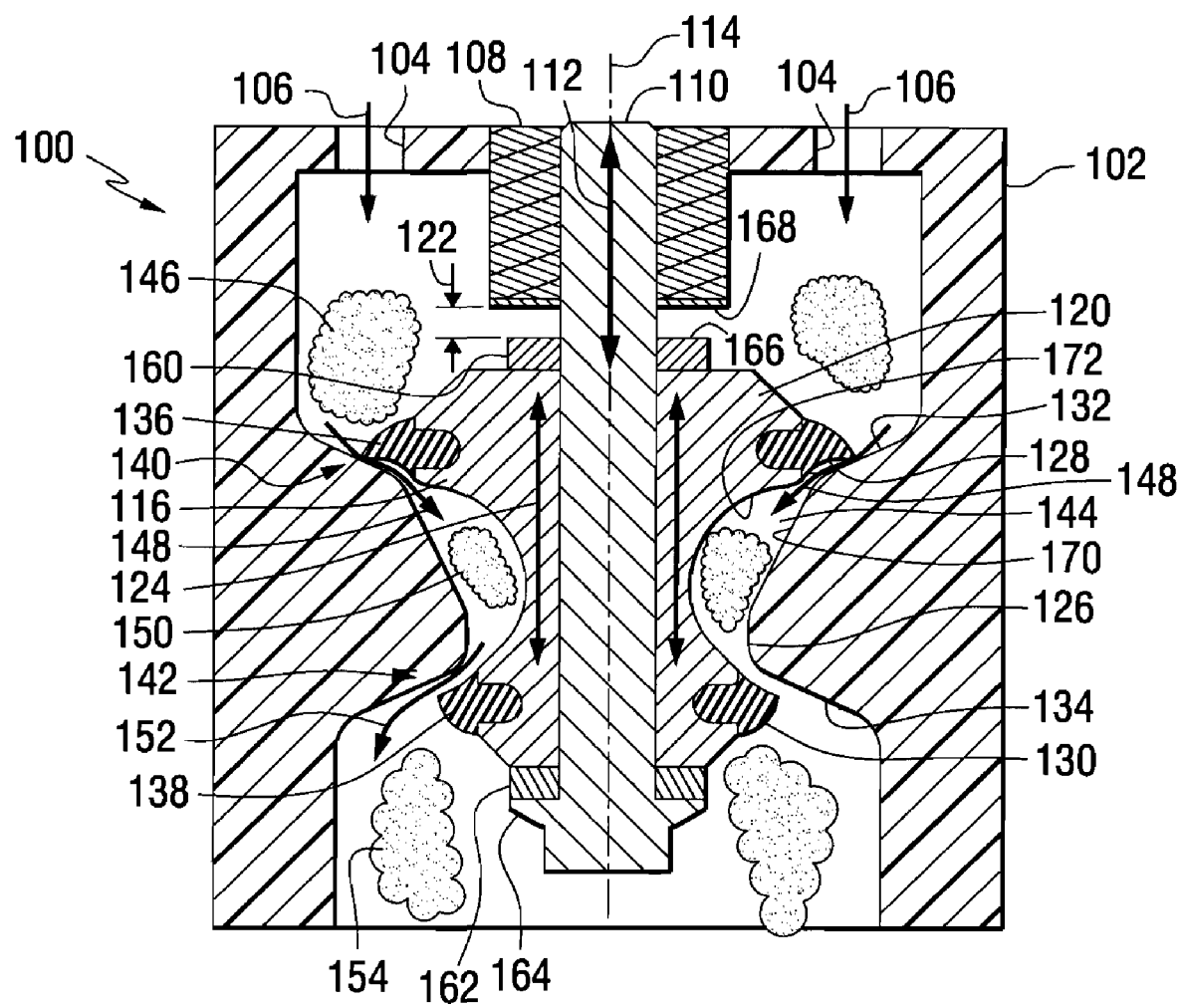
FIG. 4 is a sectional view of an ejection valve in accordance with the invention.

FIG. 4 shows a dust ejection valve 100, which may be provided as valve 80 in FIG. 3, and valve 50 in FIGS. 1, 2. Dust ejection valve 100 includes a housing 102 having one or more inlet ports 104 receiving dust or other effluent as shown at arrows 106. A stationary bushing 108 in the housing receives and guides stud 110 for axial reciprocal movement therein as shown at arrows 112 along a vertical oscillation axis 114 in the orientation of FIG. 4. Stud 110 has a spool 116 rigidly mounted thereto and reciprocating vertically therewith, to provide an inertial mass 120 inertially activated and driven by the noted vibration, e.g. of engine 92 to which sleeve 78 and valve 100 are mounted, or by the vibration of an engine-driven component such as an eccentric rotary weight or the like.

Inertial mass 120 is inertially activated and driven by the noted vibration to discharge dust from the air induction system. In one embodiment, the inertial mass is a plunger as shown in FIG. 4 inertially driven by the vibration to vibrate and oscillate to an amplitude 122 along axial oscillation axis 114. Plunger inertial mass 120 translates and oscillates along an axial travel stroke 124 in a channel 126 extending along oscillation axis 114. Plunger inertial mass 120 has at least one and preferably two valve faces 128 and 130. Channel 126 has at least one and preferably two valve seats 132 and 134 engaged by a respective valve face at a respective one of the ends of the travel stroke. In one embodiment, the plunger includes plunger body 116 and at least one and preferably two elastomeric seals 136 and 138 extending laterally therefrom relative to axial oscillation axis 114. Elastomeric seals 136 and 138 provide the noted valve faces 128 and 130, respectively. In the preferred embodiment, plunger inertial mass 120 oscillates along axial travel stroke 124 in channel 126 extending along oscillation axis 114, and the plunger has first and second axially spaced valve faces 128 and 130, and the channel has first and second axially spaced valve seats 132 and 134 engaged by the first and second valve faces 128 and 130, respectively.

First and second valve faces 128 and 130 alternately engage their respective valve seat 132 and 134 at distally opposite first and second ends of the travel stroke, to provide first and second alternately actuated shut-off valves 140 and 142, respectively. When plunger inertial mass 120 is at the noted first end of its travel stroke, e.g. the lower end of the travel stroke in the orientation of FIG. 4, first valve face 128 engages first valve seat 132, and first shut-off valve 140 is closed, and second valve face 130 disengages second valve seat 134, and second shut-off valve 142 is open. When plunger inertial mass 120 is at the noted second end of its travel stroke, e.g. the upper end in the orientation of FIG. 4, first valve face 128 disengages first valve seat 132, and first shut-off valve 140 is open, and second valve face 130 engages second valve seat 134, and second shut-off valve 142 is closed.

Channel 126 has a transfer holding plenum 144 axially between first and second valve seats 132 and 134. Transfer holding plenum 144 receives dust from the air induction system, e.g. as shown at dust particles 146, when plunger inertial mass 120 is at the noted second end of its travel stroke (e.g. upper end) and first shut-off valve 140 is open. The dust flows through open shut-off valve 140 as shown at arrow 148 into transfer holding plenum 144 and is held therein as shown at dust particles 150. When plunger inertial mass 120 translates downwardly to the noted first end of its travel stroke (e.g. lower end), the transfer holding plenum 144 discharges dust 150 through the now open second shut-off valve 142 as shown at arrow 152 and as shown at exiting dust particles 154. In one embodiment, plunger inertial mass 120 is gravitationally biased to the lower end of its travel stroke. In another embodiment, FIGS. 5, 6, 9, to be described, a spring is provided in transfer holding plenum 144 biasing the plunger to the noted first end of its travel stroke, which spring may be a spiral compression spring disposed concentrically around the plunger and extending axially therealong and axially spanning the transfer holding plenum. In one embodiment, the inertial mass provided by plunger 120 operates over a range including at least the following: 11.5 Hz oscillation frequency; 1.5 inch oscillation amplitude.

Plunger inertial mass 120 includes upper and lower washers or grommets 160 and 162, FIG. 4. Lower grommet 162 is trapped between spool body 116 and lower enlarged head 164 of stud 110. Upper grommet 160 has an axially upwardly facing impactor surface 166. Channel 126 of the housing has an axially downwardly facing impaction anvil surface 168 at the lower end of bushing 108 axially facing impactor surface 166 and axially separated therefrom by the noted axial gap 122 providing the noted oscillation amplitude and travel stroke. Impaction anvil surface 168 is impacted by impactor surface 166 during oscillation of plunger inertial mass 120 along its axial travel stroke along oscillation axis 114. Impactor surface 166 repeatedly strikes anvil surface 168 to provide a hammer-effect, fostering vibratory feeder movement of dust through channel 126.

Channel 126 has a sidewall 170 laterally facing plunger inertial mass 120 and extending axially between first and second valve seats 132 and 134. Plunger inertial mass 120 has a sidewall 172 laterally facing sidewall 170 of channel 126 and extending axially between first and second valve faces 128 and 130. At least one of the sidewalls is recessed away from the other of the sidewalls to define a cavity at 144 therebetween, which cavity provides the noted transfer holding plenum. For example in FIG. 4, sidewall 172 is recessed away from sidewall 170. Cavity 144 is in alternate open communication through the noted first and second shut-off valves 140 and 142, namely to receive dust from the air induction system through an open first shut-off valve 140 when plunger inertial mass 120 is at the noted second end of its travel stroke (e.g. upper end), and to discharge dust through an open second shut-off valve 142 when plunger inertial mass 120 is at the noted first end of its travel stroke (e.g. lower end).

The system provides a method for ejecting dust from an air induction system of an internal combustion engine in a vibratory system generating vibration, the method including providing a dust ejection valve 80, 100 including an inertial mass 120, and inertially activating and driving the inertial mass by vibration to discharge dust from the air induction system. The method includes providing the inertial mass as a plunger, and inertially driving the plunger by the vibration to vibrate and oscillate to an amplitude along an axial oscillation axis 114, and translating and oscillating the plunger inertial mass 120 along an axial travel stroke in a channel 126 extending along the oscillation axis, and providing the plunger inertial mass with at least one valve face, and providing the channel with at least one valve seat, and engaging the valve face and the valve seat at one end of the travel stroke. The method includes providing the plunger inertial mass 120 with first and second axially spaced valve faces 128 and 130, providing the channel 126 with first and second axially spaced valve seats 132 and 134, alternately engaging the first and second valve faces with their respective valve seat at distally opposite first and second ends of the travel stroke, e.g. lower and upper ends, respectively, to provide first and second alternately actuated shut-off valves 140 and 142, respectively, and inertially actuating and translating the plunger inertial mass 120 to the first end of the travel stroke (e.g. lower end) to engage the first valve face 128 with the first valve seat 132 and close the first shut-off valve 140, and disengaging the second valve face 130 from the second valve seat 134 to open the second shut-off valve 142, and inertially actuating and translating the plunger inertial mass 120 to the second end of its travel stroke (e.g. upper end) to disengage the first valve face 128 from the first valve seat 132 and open the first shut-off valve 140, and to engage the second valve face 130 with the second valve seat 134 to close the second shut-off valve 142. The method includes providing the channel 126 with a transfer holding plenum 144 axially between the first and second valve seats 132 and 134, transferring dust from the air induction system through an open first shut-off valve 140 to transfer holding plenum 144 when plunger inertial mass 120 is at the second end of its travel stroke (e.g. upper end), and discharging dust from the transfer holding plenum 144 through an open second shut-off valve 142 when the plunger inertial mass 120 is at the first end of its travel stroke (e.g. lower end). The method includes providing the plunger inertial mass 120 with an axially facing impactor surface 166, providing the channel with an impaction anvil surface 168 axially facing the impactor surface 166, and impacting the anvil surface 168 with the impactor surface 166 during oscillation of the plunger 120 along its axial travel stroke along the oscillation axis 114 and repetitively striking anvil surface 168 with impactor surface 166 to provide a hammer-effect, fostering vibratory feeder movement of dust through channel 126.

Figure 5:
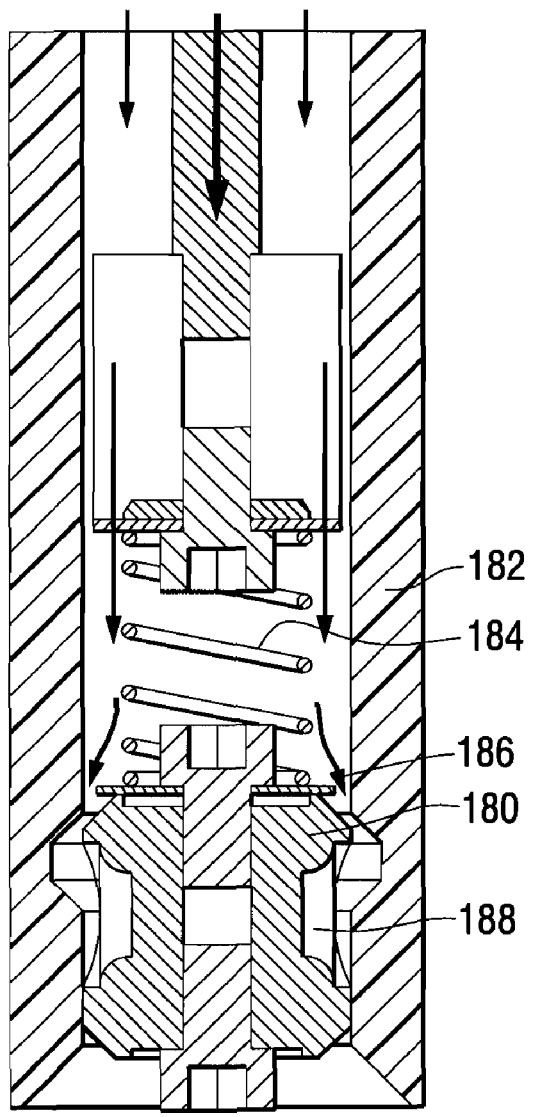
FIG. 5 is a view like FIG. 4 and shows another embodiment.
Figure 6:
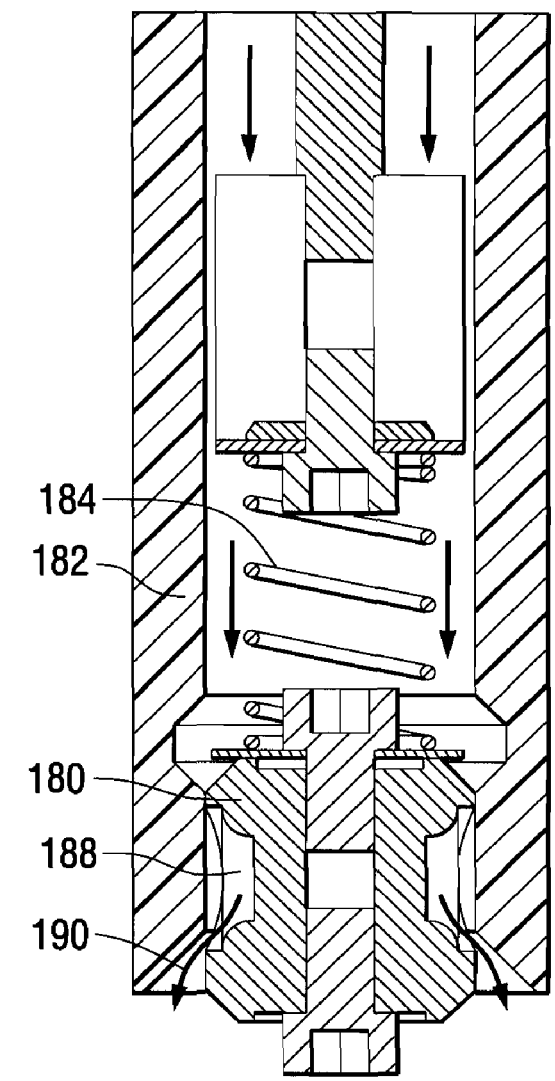
FIG. 6 is like FIG. 5 and shows a further operational condition.

FIGS. 5 and 6 show a further embodiment including plunger inertial mass 180 axially reciprocal in channel 182 and biased to one end of its travel stroke by spiral compression spring 184. FIG. 5 shows plunger inertial mass 180 at the upper end of its travel stroke receiving dust as shown at arrows 186 into transfer holding plenum 188. FIG. 6 shows plunger inertial mass 180 at the lower end of its travel stroke, discharging dust as shown at arrows 190 from transfer holding plenum 188.

Figure 7:
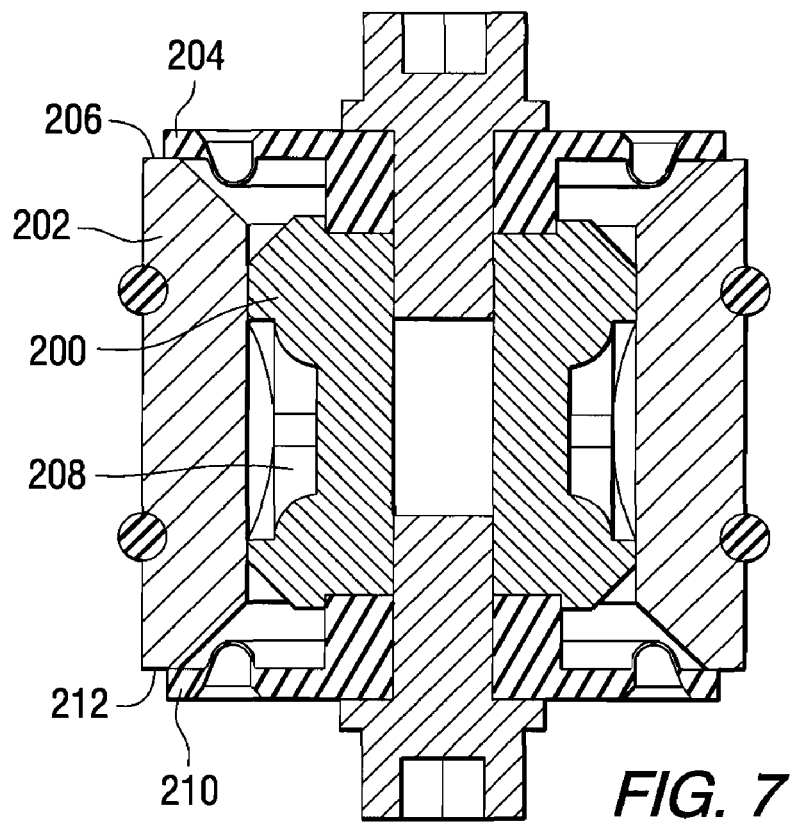
FIG. 7 is like FIG. 4 and shows another embodiment.

FIG. 7 shows a further embodiment with plunger inertial mass 200 in a neutral position in channel 202. When the plunger inertial mass translates to the upper end of its travel stroke, elastomeric gasket or seal 204 lifts upwardly off of valve seat 206 to permit dust from the air induction system to enter transfer holding plenum 208. When plunger inertial mass 200 translates downwardly to the lower end of its travel stroke, the lower elastomeric gasket or seal 210 moves downwardly away from valve seat 212 to permit the dust to be discharged from transfer holding plenum 208.

Figure 8:
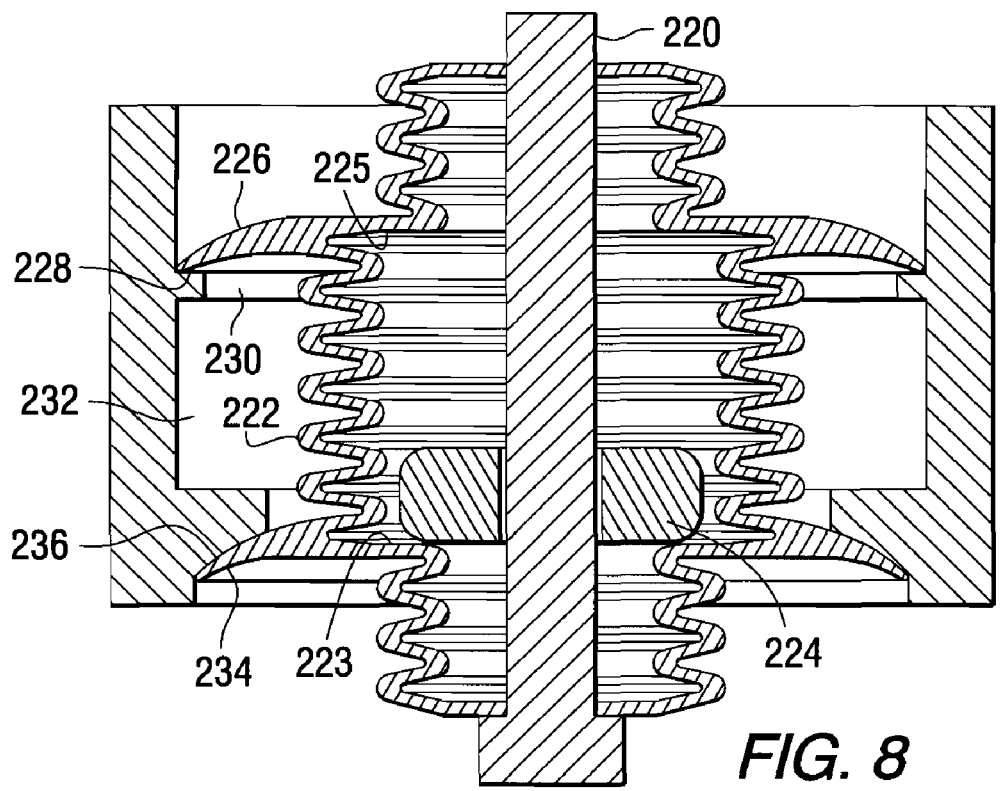
FIG. 8 is like FIG. 4 and shows another embodiment.

In FIG. 8, central stud 220 reciprocates axially up and down to flex bellows 222 providing the plunger, which may include an additional weight 224 sliding up and down along stud 220 and striking and providing impact at impaction regions 223 and 225 of the bellows. When the plunger, including weight 224, translates to the upper end of its travel stroke, elastomeric seal or gasket tip 226 lifts upwardly off of valve seat 228 to permit dust from the air induction system to flow through aperture 230 into transfer holding plenum 232. When the plunger, including weight 224, translates downwardly to the lower end of its travel stroke, lower elastomeric seal or gasket tip 234 moves downwardly away from valve seat 236 to permit the dust to be discharged from transfer holding plenum 232. This embodiment minimizes the influence of friction from dust which might otherwise gather at the interface of stud 220 and the inner diameter of oscillating weight 224.

Figure 9:
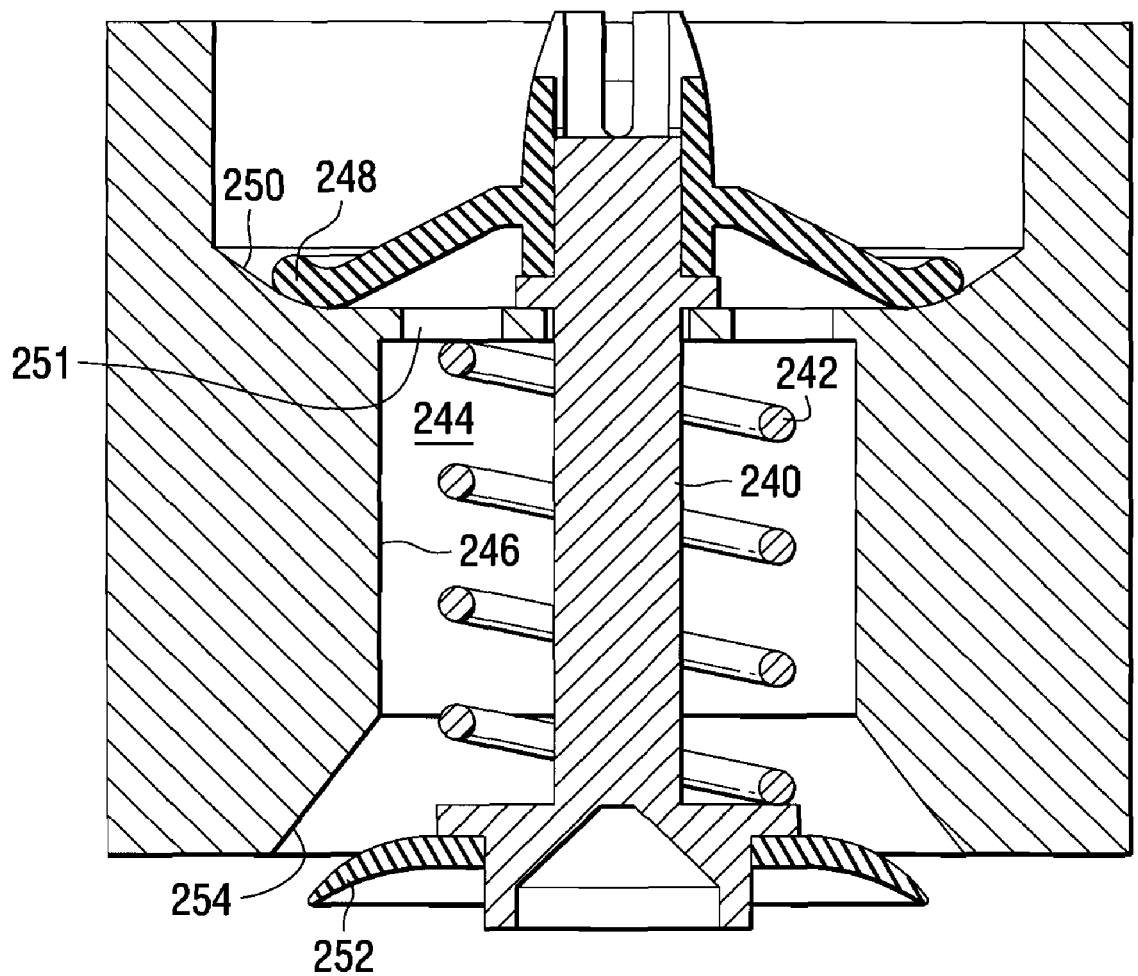
FIG. 9 is like FIG. 4 and shows another embodiment.

In FIG. 9, plunger 240 is biased to the lower end of its travel stroke by spiral compression spring 242 in transfer holding plenum 244 of channel 246. When the plunger translates axially upwardly to the upper end of its travel stroke, elastomeric seal 248 lifts upwardly off of valve seat 250, permitting dust from the air induction system to flow through aperture 251 and enter transfer holding plenum 244. When the plunger translates downwardly to the lower end of its travel stroke, as shown in FIG. 9, lower elastomeric seal 252 moves downwardly away from valve seat 254, permitting dust to be discharged from transfer holding plenum 244.

In further embodiments, instead of a linear motion of the plunger inertial mass, other non-linear motions of an inertial mass may be employed to actuate the noted valve faces into and out of engagement with respective valve seats. For example, a rocker may be employed with a rocking motion about a pivot point providing an arcuate motion at a distance spaced radially from such pivot, with the arcuate motion opening and closing the noted valves. In another example, flexible diaphragms with valve faces may be used with a cantilever arm extending therefrom and a weight at the end of the arm which translates or rocks in an arc to in turn rock the diaphragm and valve faces into and out of engagement with respective valve seats. In another example, a rotating mass may be provided with an eccentric weight spaced from the axis of rotation. In another embodiment, a teeter-totter or see-saw action may be provided with a spring and a mass to drive the valve open and closed with a leverage arm.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An ejector for an induction system in a vibratory system generating vibration, comprising an ejection valve comprising an inertial mass inertially activated and driven by said vibration to discharge contaminant from said induction system, wherein said inertial mass is a plunger inertially driven by said vibration to vibrate and oscillate to an amplitude along an axial oscillation axis, said plunger oscillates along an axial travel stroke in a channel extending along said oscillation axis, said plunger having first and second axially spaced valve faces, said channel having first and second axially spaced valve seats engaged by said first and second valve faces, respectively.

2. The ejector according to claim 1 wherein:
said first and second valve faces alternately engage their respective said valve seat at distally opposite first and second ends of said travel stroke, to provide first and second alternately actuated shut-off valves, respectively, such that:
when said plunger is at said first end of said travel stroke,
said first valve face engages said first valve seat, and said first shut-off valve is closed,
said second valve face disengages said second valve seat, and said second shut-off valve is open;
when said plunger is at said second end of said travel stroke,
said first valve face disengages said first valve seat, and said first shut-off valve is open,
said second valve face engages said second valve seat, and said second shut-off valve is closed.

3. The ejector according to claim 2 wherein said channel has a transfer holding plenum axially between said first and second valve seats, said transfer holding plenum receiving and holding contaminant from said induction system when said plunger is at said second end of said travel stroke and said first shut-off valve is open, said transfer holding plenum discharging said contaminant when said plunger is at said first end of said travel stroke and said second shut-off valve is open.

4. The ejector according to claim 3 wherein said plunger comprises a plunger body and first and second axially spaced elastomeric seals extending laterally therefrom relative to said axial oscillation axis, said first elastomeric seal providing said first valve face, said second elastomeric seal providing said second valve face.

5. The ejector according to claim 3 wherein said plunger is gravitationally biased to said first end of said travel stroke.

6. The ejector according to claim 3 comprising a spring in said transfer holding plenum biasing said plunger to said first end of said travel stroke.

7. The ejector according to claim 6 wherein said spring is a spiral compression spring disposed concentrically around said plunger and extending axially therealong and axially spanning said transfer holding plenum.

8. The ejector according to claim 1 wherein said inertial mass operates over a range including at least the following: 11.5 Hz oscillation frequency; 1.5 inch oscillation amplitude.

9. The ejector according to claim 1 wherein said ejector is a dust ejector for an air induction system of an internal combustion engine.

10. An ejector for an induction system in a vibratory system generating vibration, comprising an ejection valve comprising an inertial mass inertially activated and driven by said vibration to discharge contaminant from said induction system, said inertial mass being a plunger inertially driven by said vibration to vibrate and oscillate to an amplitude along an axial oscillation axis, said plunger translating and oscillating along an axial travel stroke in a channel extending along said oscillation axis, said plunger having at least one valve face, said channel having at least one valve seat engaged by said valve face at one end of said travel stroke, said plunger having an axially facing impactor surface separate from said valve face, said channel having an impaction anvil surface separate from said valve seat and axially facing said impactor surface and impacted thereby during oscillation of said plunger along said axial travel stroke along said oscillation axis, said impactor surface repeatedly striking said anvil surface to provide a hammer-effect, fostering vibratory feeder movement of said contaminant through said channel.

11. The ejector according to claim 10 wherein:

said plunger has first and second axially spaced said valve faces;

said channel has first and second axially spaced said valve seats engaged by said first and second valve faces, respectively;

said first and second valve faces alternately engage their respective said valve seat at distally opposite first and second ends of said travel stroke, to provide first and second alternately actuated shut-off valves, respectively, such that:

when said plunger is at said first end of said travel stroke,
said first valve face engages said first valve seat, and said first shut-off valve is closed,
said second valve face disengages said second valve seat, and said second shut-off valve is open;

when said plunger is at said second end of said travel stroke,
said first valve face disengages said first valve seat, and said first shut-off valve is open,
said second valve face engages said second valve seat, and said second shut-off valve is closed;

said channel has a transfer holding plenum axially between said first and second valve seats, said transfer holding plenum receiving and holding contaminant from said induction system when said plunger is at said second end of said travel stroke and said first shut-off valve is open, said transfer holding plenum discharging said contaminant when said plunger is at said first end of said travel stroke and said second shut-off valve is open;

said channel has a sidewall laterally facing said plunger and extending axially between said first and second valve seats;

said plunger has a sidewall laterally facing said sidewall of said channel and extending axially between said first and second valve faces;

at least one of said sidewalls is recessed away from the other of said sidewalls to define a cavity therebetween;

said cavity is in alternate open communication through said first and second shut-off valves,
to receive contaminant from said air induction system through an open said first shut-off valve when said plunger is at said second end of said travel stroke, and
to discharge said contaminant through an open said second shut-off valve when said plunger is at said first end of said travel stroke;

said cavity provides said transfer holding plenum.

12. The ejector according to claim 10 wherein said ejector is a dust ejector for an air induction system of an internal combustion engine.

13. A method for ejecting contaminant from an induction system in a vibratory system generating vibration, comprising providing an ejection valve comprising an inertial mass, and inertially activating and driving said inertial mass by said vibration to discharge contaminant from said induction system, and comprising providing said inertial mass as a plunger, and inertially driving said plunger by said vibration to vibrate and oscillate to an amplitude along an axial oscillation axis, and translating and oscillating said plunger along an axial travel stroke in a channel extending along said oscillation axis, providing said plunger with at least one valve face providing said channel with at least one valve seat, and engaging said valve face and said valve seat at one end of said travel stroke, and comprising:

providing said plunger with first and second axially spaced said valve faces;

providing said channel with first and second axially spaced said valve seats;

alternately engaging said first and second valve faces with their respective said valve seat at distally opposite first and second ends of said travel stroke, to provide first and second alternately actuated shut-off valves, respectively;

inertially actuating and translating said plunger to said first end of said travel stroke to engage said first valve face with said first valve seat and close said first shut-off valve, and disengaging said second valve face from said second valve seat to open said second shut-off valve;

inertially actuating and translating said plunger to said second end of said travel stroke to disengage said first valve face from said first valve seat and open said first shut-off valve, and to engage said second valve face with said second valve seat to close said second shut-off valve.

14. The method according to claim 13 comprising:

providing said channel with a transfer holding plenum axially between said first and second valve seats;

transferring contaminant from said air induction system through an open said first shut-off valve to said transfer holding plenum when said plunger is at said second end of said travel stroke;

discharging said contaminant from said transfer holding plenum through an open said second shut-off valve when said plunger is at said first end of said travel stroke.

15. A method for ejecting contaminant from an induction stem in a vibrato system generating vibration comprising providing an ejection valve comprising an inertial mass, and inertially activating and driving said inertial mass by said vibration to discharge contaminant from said induction system, and comprising providing said inertial mass as a plunger, and inertially driving said plunger by said vibration to vibrate and oscillate to an amplitude along an axial oscillation axis, and translating and oscillating said plunger along an axial travel stroke in a channel extending along said oscillation axis, providing said plunger with at least one valve face providing said channel with at least one valve seat, and engaging said valve face and said valve seat at one end of said travel stroke, and comprising:

providing said plunger with an axially facing impactor surface separate from said valve face;

providing said channel with an impaction anvil surface separate from said valve seat and axially facing said impactor surface;

impacting said anvil surface with said impactor surface during oscillation of said plunger along said axial travel stroke along said oscillation axis and repetitively striking said anvil surface with said impactor surface to provide a hammer-effect, fostering vibratory feeder movement of said contaminant through said channel.

16. The method according to claim 15 comprising operating said inertial mass over a range including at least the following: 11.5 Hz oscillation frequency; 1.5 inch oscillation amplitude.

17. The method according to claim 15 comprising a method for ejecting dust from an air induction system of an internal combustion engine, comprising providing a dust ejection valve comprising an inertial mass, and inertially activating and driving said inertial mass by said vibration to discharge dust from said air induction system.

* * * * *